United States Patent
Gustafson et al.

(10) Patent No.: US 7,434,987 B1
(45) Date of Patent: Oct. 14, 2008

(54) METHOD TO DETECT HELIUM LEAKAGE FROM A DISK DRIVE

(75) Inventors: John R. Gustafson, Los Gatos, CA (US); Victor W. Santini, Mountain View, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/832,491

(22) Filed: Aug. 1, 2007

(51) Int. Cl.
*G01N 25/00* (2006.01)
*G01K 13/00* (2006.01)
*G01K 7/00* (2006.01)

(52) U.S. Cl. ............... 374/4; 374/185; 374/141

(58) Field of Classification Search ............ 374/4
See application file for complete search history.

(56) References Cited

U.S. PATENT DOCUMENTS

| | | | |
|---|---|---|---|
| 5,454,157 A | 10/1995 | Ananth et al. | |
| 5,978,163 A | 11/1999 | Cunningham | |
| 6,055,120 A | 4/2000 | Schirle | |
| 6,078,455 A | 6/2000 | Enarson et al. | |
| 6,088,662 A | 7/2000 | Flinsbaugh et al. | |
| 6,266,203 B1 | 7/2001 | Street et al. | |
| 6,392,838 B1 | 5/2002 | Hearn et al. | |
| 6,525,899 B2 | 2/2003 | Hearn et al. | |
| 6,567,235 B2 | 5/2003 | Kasetty et al. | |
| 6,646,821 B2 | 11/2003 | Bernett et al. | |
| 6,683,747 B2 | 1/2004 | Bernett | |
| 6,731,453 B2 | 5/2004 | Korbel et al. | |
| 6,744,586 B2 | 6/2004 | Ukani et al. | |
| 6,819,517 B2 | 11/2004 | Fioravanti et al. | |
| 6,958,876 B2 | 10/2005 | Feliss et al. | |
| 7,009,800 B2 | 3/2006 | Yang | |
| 7,016,145 B2 | 3/2006 | Gunderson et al. | |
| 7,062,387 B1 | 6/2006 | Burns et al. | |
| 7,079,348 B2 | 7/2006 | Ishii et al. | |
| 2003/0179489 A1 | 9/2003 | Bernett et al. | |
| 2008/0068755 A1* | 3/2008 | Aoyagi et al. ............ 360/137 |

* cited by examiner

*Primary Examiner*—Gail Verbitsky
*Assistant Examiner*—Mirellys Jagan
(74) *Attorney, Agent, or Firm*—Barcelo & Harrison, LLP

(57) ABSTRACT

A method to detect helium leakage from a disk drive enclosure is disclosed and claimed. A measurement electrical current is passed through a temperature sensor disposed within the disk drive enclosure. A reference electrical resistance corresponds to a reference temperature of the temperature sensor. A heating electrical current is passed through the temperature sensor. A heated electrical resistance of the temperature sensor, corresponding to a heated temperature of the temperature sensor that exceeds the reference temperature by at least 5° C., is determined. A value that corresponds to a quantity of helium within the disk drive enclosure is determined based on the reference electrical resistance and heated electrical resistance.

21 Claims, 4 Drawing Sheets

---

200

212 — Determine a reference electrical resistance (corresponding to a reference temperature) of a first temperature sensor in a disk drive.

214 — Pass a heating electrical current through the first temp sensor.

216 — Determine a heated electrical resistance (corresponding to a heated temp ≥ ref temp + 5°C) of the first temperature sensor.

218 — Determine a value corresponding to a quantity of helium within the disk drive, based on the ref & heated electrical resistances.

200

212: Determine a reference electrical resistance (corresponding to a reference temperature) of a first temperature sensor in a disk drive.

214: Pass a heating electrical current through the first temp sensor.

216: Determine a heated electrical resistance (corresponding to a heated temp ≥ ref temp + 5°C) of the first temperature sensor.

218: Determine a value corresponding to a quantity of helium within the disk drive, based on the ref & heated electrical resistances.

FIG. 2

METHOD TO DETECT HELIUM LEAKAGE FROM A DISK DRIVE

FIELD OF THE INVENTION

The present invention relates generally to information storage devices, and in particular to hermetically sealed disk drive information storage devices containing helium.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen.

Disk drive enclosures that are designed to contain helium are typically hermetically sealed to prevent an unacceptable rate of helium leakage. Although some negligible amount of helium leakage is unavoidable, a non-negligible amount of helium leakage is undesirable because it can alter the thickness of the gas lubrication film between the head and the disk, and thereby affect the performance of the head, and because it can alter the tribochemistry of the head disk interface, possibly leading to degradation in reliability, and ultimately head crashes and associated data loss. Even if non-negligible helium leakage from the disk drive enclosure were to occur, data loss might be ultimately prevented if such helium leakage were detected early enough. Thus, there is a need in the art for a method to detect helium leakage from a disk drive enclosure.

SUMMARY

A method to detect helium leakage from a disk drive enclosure is disclosed and claimed. A measurement electrical current is passed through a temperature sensor disposed within the disk drive enclosure. A reference electrical resistance corresponds to a reference temperature of the temperature sensor. A heating electrical current is passed through the temperature sensor. A heated electrical resistance of the temperature sensor, corresponding to a heated temperature of the temperature sensor that exceeds the reference temperature by at least 5° C., is determined. A value that corresponds to a quantity of helium within the disk drive enclosure is determined based on the reference electrical resistance and heated electrical resistance.

BRIEF DESCRIPTION OF THE DRAWINGS

FIG. 2 depicts a method to detect helium leakage from a disk drive enclosure according to an embodiment of the present invention.

DESCRIPTION OF THE PREFERRED EMBODIMENTS

Figure 1A:
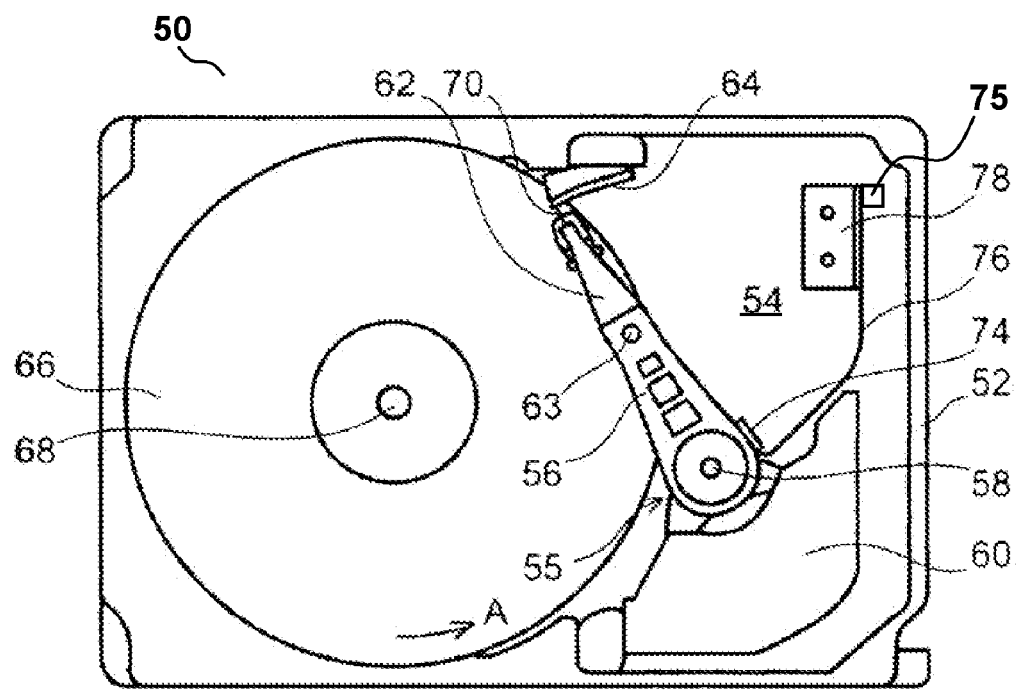
FIG. 1A is a plan view showing a schematic construction of a magnetic disk drive that is capable of use with an embodiment of the present invention.

FIG. 1A is a plan view showing a schematic construction of a magnetic disk drive 50 that is capable of use with an embodiment of the present invention. A housing 52 together with an adjoining housing lid (not shown to enable viewing of internal components) forms a hermetically-sealed disk drive enclosure 54 capable of isolating a clean gas from an outside environment. Enclosed within the disk drive enclosure 54 is a head gimbal assembly (HGA) 62 that includes a read/write head that can be loaded and unloaded from the surface of a disk 66 by the interaction between a load tang 70 and a ramp 64. The disk 66, also enclosed within the disk drive enclosure 54, is mounted on a spindle 68 that enables the disk 66 to rotate as indicated by arrow A. HGA 62 is attached to an actuator arm 56, for example by swaging at hole 63. Actuator arm 56 pertains to actuator assembly 55, which pivots about pivot bearing cartridge 58 in response to a voice coil electromagnet interaction with a static magnetic field provided by permanent magnet assembly 60. The actuator assembly 55 may be formed by extruding aluminum and then cutting away material to form the arms. Less preferably, the actuator assembly 55 may be formed by die-casting.

A circuit board (not shown) for controlling an operation of the magnetic disk device 50, and for enabling data communications between the magnetic disk device 50 and an external host, is mounted on the bottom of the housing 52. The electrical path between the circuit board and read/write head of HGA 62 includes flex cable 76, an insulated via through housing 52 in the vicinity of flex bracket 78, and may include a preamplifier 74 mounted on the actuator assembly 55. Consistent with an embodiment of the present invention, a temperature sensor 75 may be mounted on the flex bracket 78 (or directly on flex cable 76). The temperature sensor 75 is preferably electrically coupled to a disk drive controller on the circuit board through the insulated via through housing 52 in the vicinity of flex bracket 78. Such electrical coupling may pass through an amplifier, may include an electrical connection to the flex cable 76, and/or may include sampling by an analog-to-digital converter on the circuit board.

Figure 1B:
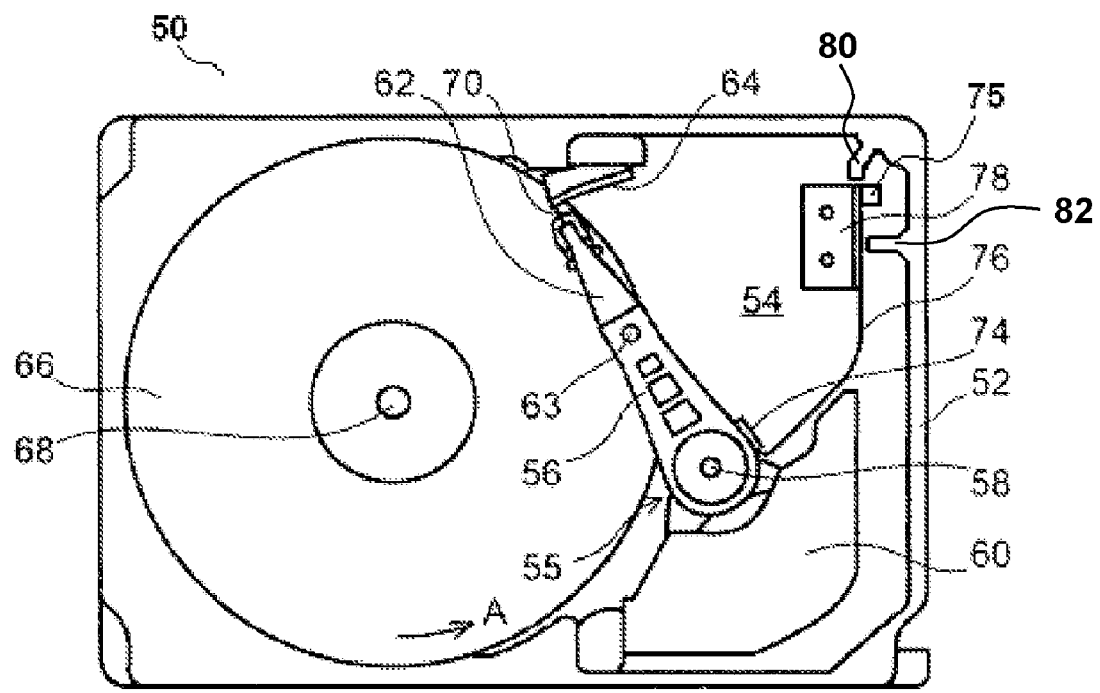
FIG. 1B is a plan view showing a schematic construction of another magnetic disk drive that is capable of use with an embodiment of the present invention.

It is preferable in the present context for the temperature sensor 75 to be more sensitive to changes in gas composition than to changes in local gas velocity. As such, the temperature sensor 75 may optionally include a partially or completely enclosing local shroud to separate the temperature sensor 75 from the gas flow while permitting gas diffusion between the interior of the local shroud and the rest of the disk drive enclosure so that no significant gas composition gradient across the shroud boundary will exist. For example, in FIG. 1B, the housing 52 has been modified to include upper and lower projections 80, 82 that work together with the flex bracket 78 to provide a local shroud that partially encloses the temperature sensor 75. The local shroud shown in FIG. 1B serves to separate the temperature sensor 75 from the gas flow induced by motion of the disk 66 and actuator arm 56, while permitting gas diffusion between the interior of the local shroud and the rest of the disk drive enclosure so that no significant gas composition gradient across the shroud boundary (created by flex bracket 78 and housing projections 80, 82) will exist.

FIG. 2 depicts a method 200 to detect helium leakage from a disk drive enclosure according to an embodiment of the present invention. Method 200 takes advantage of the higher thermal conductivity of helium gas relative to air and/or a vacuum. In step 212 a reference electrical resistance of a first temperature sensor disposed within the disk drive enclosure is determined. The first temperature sensor may be a thermistor, for example. The reference electrical resistance corresponds to a reference temperature of the first temperature sensor, and may be measured by passing a measurement electrical current through the first temperature sensor. For example, the measurement electrical current may be in the range 0.04 mA to 6.7 mA. Alternatively, the reference electrical resistance may be calculated based on a temperature of the disk drive enclosure that is measured by a second temperature sensor (e.g. an existing conventional temperature sensor used by the disk drive controller for other purposes).

In step 214 a heating electrical current is passed through the first temperature sensor, and in step 216 a heated electrical resistance of the first temperature sensor is determined. The heated electrical resistance can be determined either during, or following, the application of the heating electrical current to the first temperature sensor. The heated electrical resistance of the first temperature sensor is preferably determined while the disk is not rotating relative to the disk drive enclosure, or while the disk is rotating and the actuator is stationary relative to the disk drive enclosure. The heating electrical current is preferably more than twice the measurement electrical current. For example, the heating electrical current may be in the range 2 mA to 50 mA. The heated electrical resistance corresponds to a heated temperature of the first temperature sensor that exceeds the reference temperature of the first temperature sensor by a temperature rise of at least 5° C. Preferably, the heated temperature of the first temperature sensor minus the reference temperature of the first temperature sensor is at least 15° C. but no more than 100° C.

In step 218, a value that corresponds to a quantity of helium within the disk drive enclosure is determined based on the reference electrical resistance and heated electrical resistance. Preferably, the determined value is then compared to an expected value corresponding to a condition in which negligible helium has leaked, and if the determined value is greater than the expected value, a register corresponding to helium leakage is set. For example, a difference between the reference electrical resistance and the heated electrical resistance may be compared to a plurality of expected differences stored in a lookup table that corresponds to the particular disk drive or to disk drives of that model or manufacturing lot. Alternatively, for example, the heated electrical resistance may be compared to an expected resistance calculated based on the reference electrical resistance and an algorithm that corresponds to the particular disk drive or to disk drives of that model or manufacturing lot. The register corresponding to helium leakage may reside in the disk drive controller chip and, if it is set, immediately cause the actuator to retract the heads to a parked position to avoid a possible head crash and associated permanent loss of data. The setting of the register may also instigate a communication to the host computer that ultimately leads to a human-readable warning that the disk drive requires service (e.g. temporary or permanent helium re-fill and re-sealing) to recover data and/or prevent permanent data loss.

Figure 3:
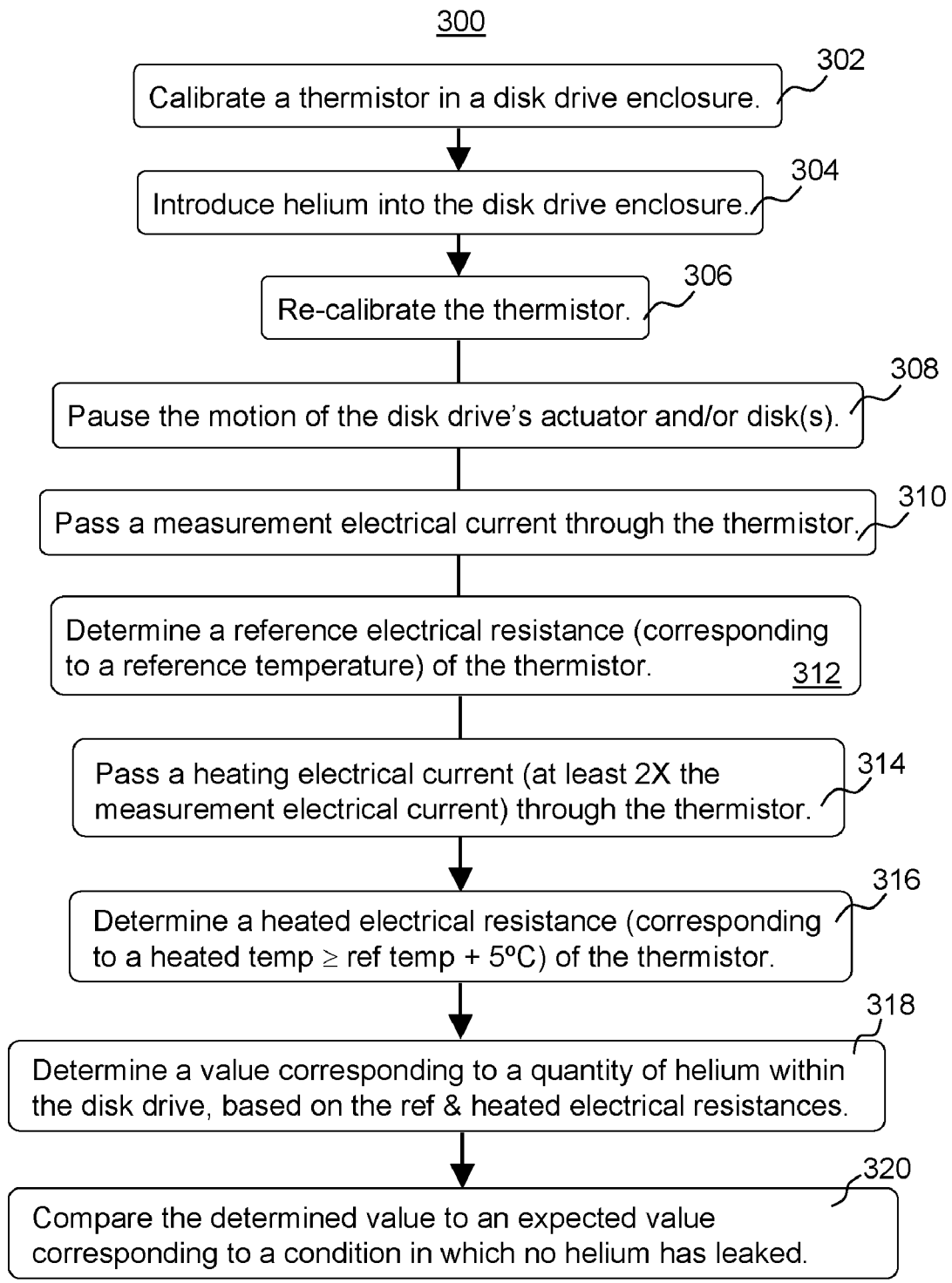
FIG. 3 depicts a method to detect helium leakage from a disk drive enclosure according to another embodiment of the present invention.

FIG. 3 depicts a method 300 to detect helium leakage from a disk drive enclosure according to another embodiment of the present invention. In step 302 a thermistor in a disk drive enclosure is calibrated in an ambient air atmosphere, for example by measuring the electrical resistance of the thermistor while a varying electrical current is passed through the thermistor. Step 302 would preferably be accomplished during the initial manufacture of a disk drive containing helium, before helium is introduced in the enclosure and preferably but not necessarily before the disk drive enclosure is hermetically sealed. The result of such a calibration may be a table of resistance values and corresponding electrical currents for the ambient air atmosphere within the disk drive enclosure. If the temperature of the thermistor is independently measured, such a table of resistance values may also include corresponding thermistor temperatures.

In step 304, helium gas is introduced into the disk drive enclosure, and in step 306 the thermistor is re-calibrated. For example, the thermistor may be re-calibrated by measuring the electrical resistance of the thermistor while a varying electrical current is passed through the thermistor. Step 304 would preferably be accomplished during the initial manufacture of a disk drive containing helium, just after helium is introduced in the enclosure and the disk drive enclosure is hermetically sealed, however the re-calibration could be optionally repeated later during disk drive operation. The result of such a re-calibration may be a table of resistance values and corresponding electrical currents for the helium-containing atmosphere within the disk drive enclosure. If the temperature of the thermistor is independently measured during this re-calibration, such a table of resistance values may also include corresponding thermistor temperatures.

In step 308, the motion of the actuator within the disk drive enclosure, and/or the rotation of the disks within the disk drive enclosure, is paused. For example, the pause of actuator motion and/or disk rotation can be responsive to, and can last for a period governed by, the disk drive controller. Such a pause of actuator motion and/or disk rotation may enhance the accuracy of thermistor resistance and/or temperature measurements by reducing temporal fluctuation in convective heat transfer within the disk drive enclosure due to local gas flow velocity variation.

In step 310, a measurement current is passed through the thermistor, for example to facilitate determination in step 312 of a reference electrical resistance corresponding to a reference temperature of the thermistor. For example, the measurement current may be in the range 0.04 mA to 6.7 mA.

In step 314 a heating electrical current is passed through the thermistor, and in step 316 a heated electrical resistance of the thermistor is determined. The heated electrical resistance can be determined either during, or following, the application of the heating electrical current to the thermistor. The heating electrical current is preferably more than twice the measurement electrical current. For example, the heating electrical current may be in the range 2 mA to 50 mA. The heated electrical resistance corresponds to a heated temperature of the thermistor that exceeds the reference temperature of the thermistor by a temperature rise of at least 5° C.

In step 318, a value that corresponds to a quantity of helium within the disk drive enclosure is determined based on the reference electrical resistance and heated electrical resistance. Then in step 320, the determined value is compared to an expected value corresponding to a condition in which negligible helium has leaked. Preferably, if the determined value exceeds the expected value, a register corresponding to helium leakage is set. For example, a difference between the reference electrical resistance and the heated electrical resistance may be compared to a plurality of expected differences stored in a lookup table that corresponds to the particular disk drive or to disk drives of that model or manufacturing lot. Alternatively, for example, the heated electrical resistance may be compared to an expected resistance calculated based on the reference electrical resistance and an algorithm that corresponds to the particular disk drive or to disk drives of that model or manufacturing lot.

Figure 4:
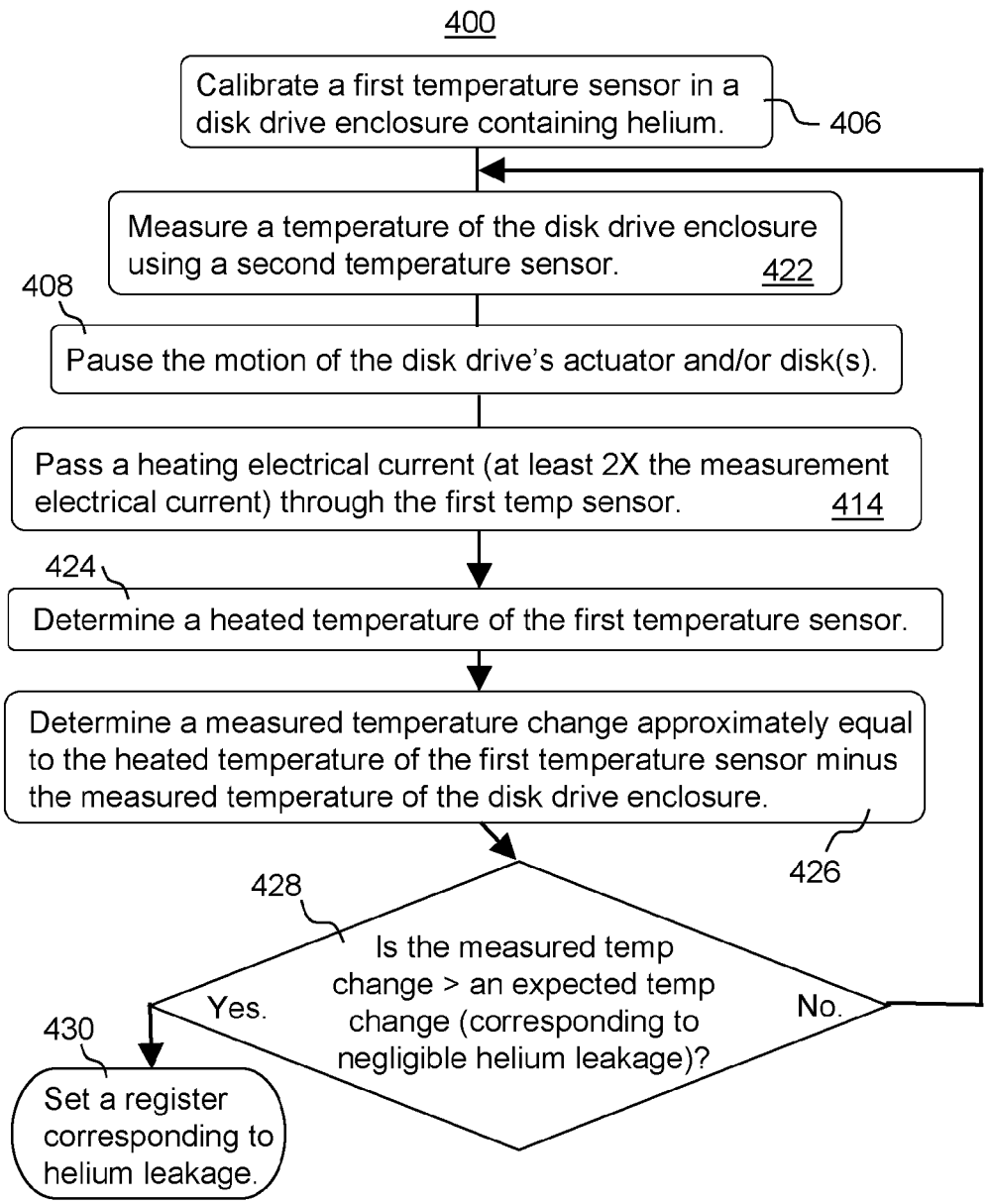
FIG. 4 depicts a method to detect helium leakage from a disk drive enclosure according to another embodiment of the present invention.

FIG. 4 depicts a method 400 to detect helium leakage from a disk drive enclosure according to another exemplary embodiment of the present invention. In step 406 a first temperature sensor in a disk drive enclosure containing helium is calibrated. For example, the first temperature sensor may be calibrated by measuring the electrical resistance of the first temperature sensor under a plurality of electrical current conditions. A first one of the plurality of electrical current conditions may include passing an electrical current in the range 0.04 mA to 6.7 mA through the first temperature sensor. A second one of the plurality of electrical current conditions may include passing a current in the range 2 mA to 50 mA through the first temperature sensor. The result of such a calibration may be a table of resistance values and corresponding electrical currents, stored in a lookup table, for the helium-containing atmosphere within the disk drive enclosure. If the temperature of the first temperature sensor is independently measured during this calibration, such a table of resistance values may also include corresponding temperatures.

In step 422 of the embodiment of FIG. 4, a temperature of the disk drive enclosure is measured using a second temperature sensor (e.g. an existing conventional temperature sensor used by the disk drive controller for other purposes). Alternatively, a temperature of the disk drive enclosure can be determined based on the reference electrical resistance of the first temperature sensor.

In step 408, the motion of the actuator within the disk drive enclosure, and/or the rotation of the disks within the disk drive enclosure, is paused. For example, the pause of actuator motion and/or disk rotation can be responsive to, and can last for a period governed by, the disk drive controller. Such a pause of actuator motion and/or disk rotation may enhance the accuracy of temperature measurements by reducing temporal fluctuation in convective heat transfer around the first temperature sensor due to local gas flow velocity variation.

In step 414 a heating electrical current is passed through the first temperature sensor, and in step 424 a heated temperature of the first temperature sensor is determined. Preferably the heated temperature of the first temperature sensor is determined based on the heated electrical resistance of the first temperature sensor. The heated temperature of the first temperature sensor can be determined either during, or following, the application of the heating electrical current to the first temperature sensor. The heating electrical current may preferably be in the range 2 mA to 50 mA.

In step 426 of the embodiment of FIG. 4, a measured temperature change is determined as approximately equaling the heated temperature of the first temperature sensor minus the measured temperature of the disk drive enclosure. The measured temperature change is at least 5° C., and preferably at least 15° C. but no more than 100° C. Alternatively, the measured temperature change may also be determined as being approximately equal to the heated temperature of the first temperature sensor minus a reference temperature of the first temperature sensor (preferably measured while a measurement electrical current less than half of the heating electrical current is being passed through the first temperature sensor). As shown in decision block 428 and terminal block 430 of the flow chart of FIG. 400, if the measured temperature change is greater than an expected temperature change corresponding to negligible helium leakage, then a register corresponding to helium leakage is set. Otherwise the measurement of block 422 is repeated, preferably after a period governed by the disk drive controller.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A method to detect helium leakage from a disk drive enclosure, the method comprising:
    determining a reference electrical resistance of a first temperature sensor disposed within the disk drive enclosure, the reference electrical resistance corresponding to a reference temperature of the first temperature sensor;
    passing a heating electrical current through the first temperature sensor;
    determining a heated electrical resistance of the first temperature sensor, the heated electrical resistance corresponding to a heated temperature of the first temperature sensor that exceeds the reference temperature of the first temperature sensor by a temperature rise of at least 5° C.; and
    determining a value that corresponds to a quantity of helium within the disk drive enclosure based on the reference electrical resistance and heated electrical resistance.

2. The method of claim 1 wherein the heating electrical current is in the range 2 mA to 50 mA.

3. The method of claim 1 wherein the first temperature sensor is a thermistor.

4. The method of claim 1 wherein the determined value is compared to a plurality of stored values, each of the plurality of stored values corresponding to a quantity of helium within the disk drive enclosure.

5. The method of claim 1 wherein the heated temperature of the first temperature sensor minus the reference temperature of the first temperature sensor is at least 15° C. but no more than 100° C.

6. The method of claim 1 wherein the disk drive enclosure encloses a disk, and the heated electrical resistance of the first temperature sensor is determined while the disk is not rotating relative to the disk drive enclosure.

7. The method of claim 1 wherein the disk drive enclosure encloses a disk and a head coupled to an actuator, and the heated electrical resistance of the first temperature sensor is determined while the disk is rotating and the actuator is stationary relative to the disk drive enclosure.

8. The method of claim 1 further comprising measuring a temperature of the disk drive enclosure using a second temperature sensor.

9. The method of claim 8 wherein the reference electrical resistance of the first temperature sensor is determined by a calculation based on the temperature of the disk drive enclosure that is measured by the second temperature sensor.

10. The method of claim 1 further comprising comparing the determined value to an expected value corresponding to a condition in which negligible helium has leaked.

11. The method of claim 10 wherein if the determined value is greater than the expected value, a register corresponding to helium leakage is set.

12. The method of claim 1 further comprising calibrating the first temperature sensor before and after introducing helium into the disk drive enclosure.

13. The method of claim 12 wherein calibration includes measuring resistances of the first temperature sensor under a plurality of electrical current conditions.

14. The method of claim 13 wherein a first one of the plurality of electrical current conditions includes passing an electrical current in the range 0.04 mA to 6.7 mA through the first temperature sensor, and a second one of the plurality of electrical current conditions includes passing a current in the range 2 mA to 50 mA through the first temperature sensor.

15. The method of claim 1 further comprising determining the heated temperature of the first temperature sensor based on the heated electrical resistance of the first temperature sensor.

16. The method of claim 15 further comprising measuring a change in temperature approximately equal to the heated temperature of the first temperature sensor minus a temperature of the disk drive enclosure.

17. The method of claim 16 further comprising comparing the measured change in temperature with an expected change in temperature corresponding to a condition in which negligible helium has leaked.

18. The method of claim 17 wherein if the measured change in sensor temperature is greater than the expected change in sensor temperature, a register corresponding to helium leakage is set.

19. The method of claim 1 wherein the reference electrical resistance of the first temperature sensor is determined by passing a measurement electrical current through the first temperature sensor, the measurement electrical current being less than half of the heating electrical current.

20. The method of claim 19 wherein the measurement electrical current is in the range 0.04 mA to 6.7 mA.

21. The method of claim 19 further comprising determining a temperature of the disk drive enclosure based on the reference electrical resistance of the first temperature sensor.

* * * * *